United States Patent [19]

Ferguson

[11] 4,014,467
[45] Mar. 29, 1977

[54] DISHWASHER AND COUPLING

[75] Inventor: George R. Ferguson, Clover, S.C.

[73] Assignee: Duff-Norton Company, Inc., Charlotte, N.C.

[22] Filed: Nov. 3, 1975

[21] Appl. No.: 628,507

[52] U.S. Cl. ............................ 239/261; 134/179; 285/316; 285/330

[51] Int. Cl.[2] ................. B05B 3/06; F16L 37/22

[58] Field of Search .............. 285/316, 277, 330; 239/264, 261; 134/179

[56] References Cited

UNITED STATES PATENTS

| 2,565,572 | 8/1951 | Pangborn | 285/316 X |
|---|---|---|---|
| 3,265,408 | 8/1966 | Dickie | 285/316 X |
| 3,361,453 | 1/1968 | Brown et al. | 285/330 X |
| 3,370,869 | 2/1968 | Dutcher | 239/264 X |
| 3,527,480 | 9/1970 | Larson | 285/316 X |
| 3,551,013 | 12/1970 | Trojanowski et al. | 285/316 X |
| 3,761,117 | 9/1973 | Shendure | 285/316 X |
| 3,866,957 | 2/1975 | Norton | 285/316 |

*Primary Examiner*—Thomas F. Callaghan
*Attorney, Agent, or Firm*—Bell, Seltzer, Park & Gibson

[57] ABSTRACT

A manually disengagable coupling for joining together fluid conduit portions for flow therethrough and a dishwasher incorporating such a coupling in a fluid conduit which has portions extending within a housing for enclosing dishes to be washed. By means of the manually disengagable coupling, portions of the fluid conduit may be removed from within the housing of the dishwasher for purposes of cleaning the dishwasher interior, while rotational and angular displacement between the joined conduit portions is resisted by characteristics of the coupling described more fully hereinafter.

9 Claims, 6 Drawing Figures

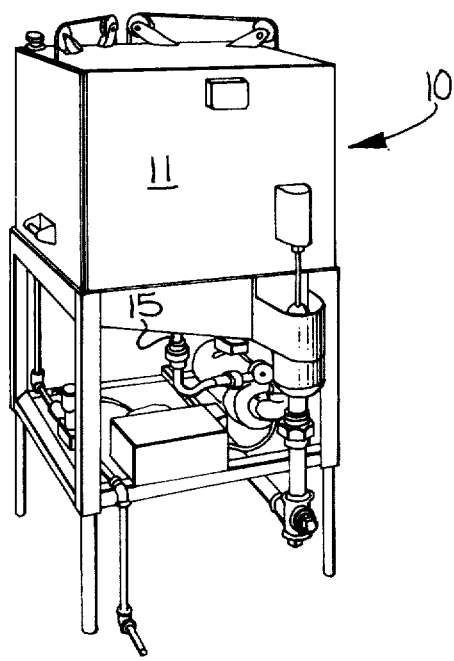
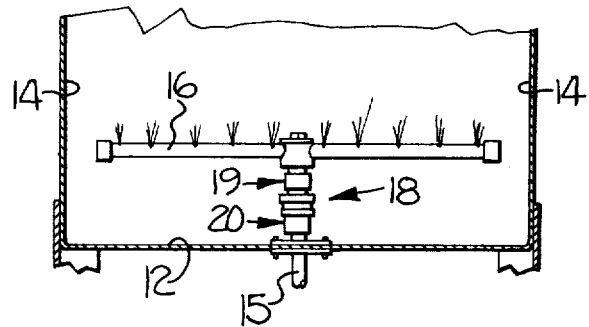
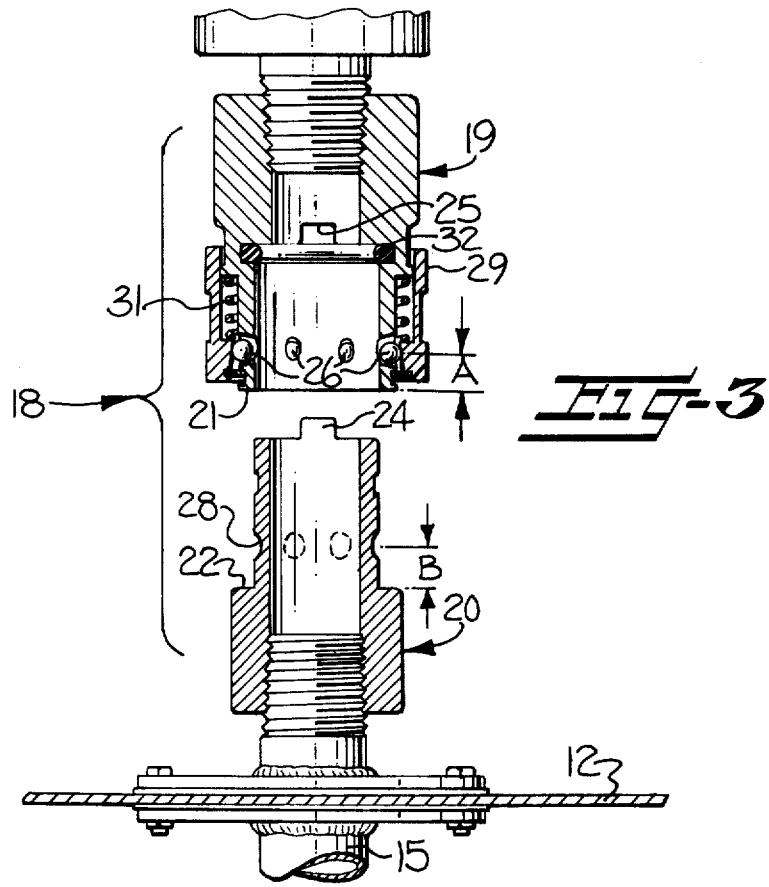

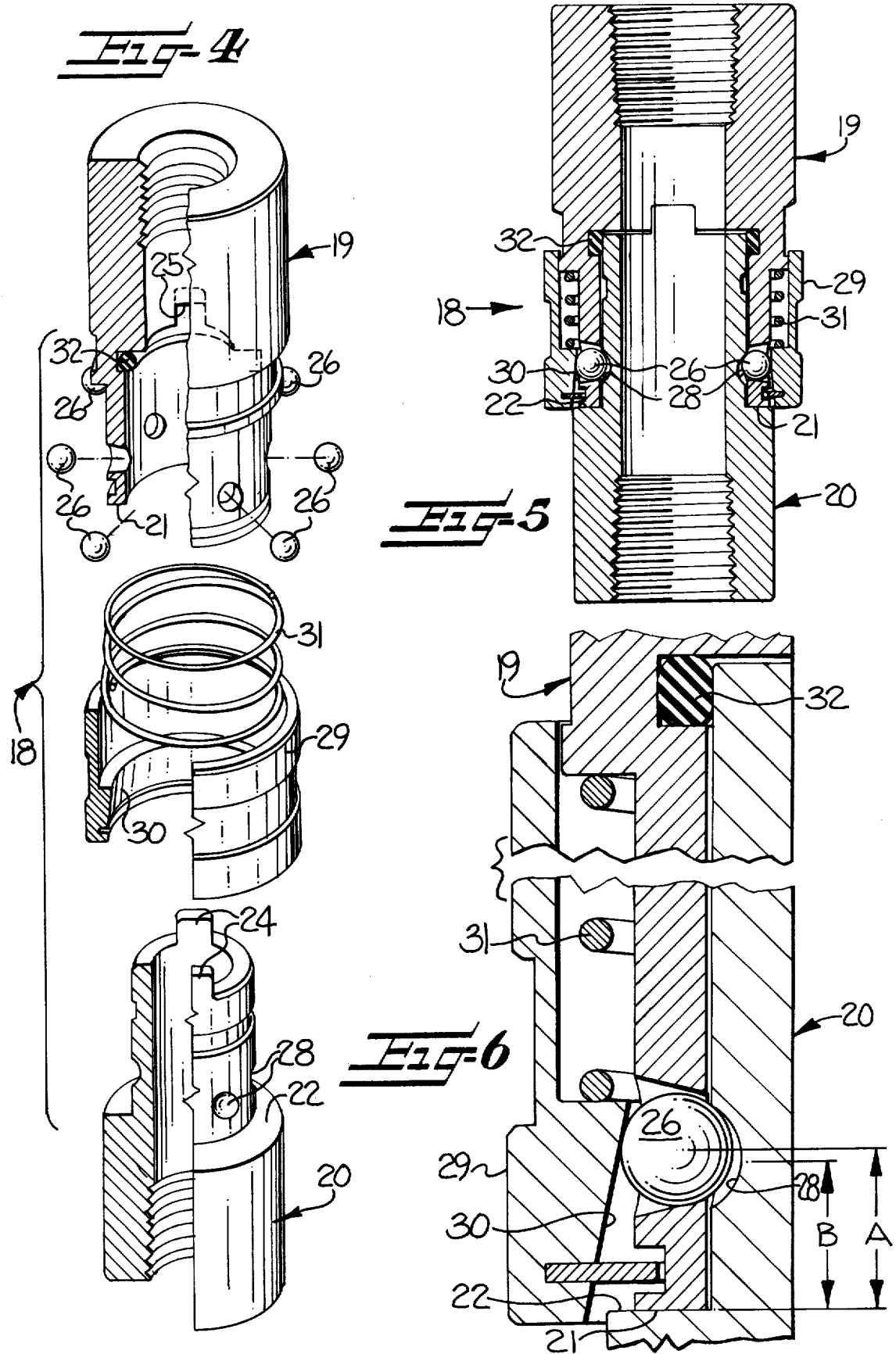

DISHWASHER AND COUPLING

In certain environments of use of fluid conduits, it is desirable to provide for ready manual separation of portions of a conduit while resisting rotational and angular displacement between the joined conduit portions. One such environment is to be found in dishwashers, and particularly in a commercial dishwasher having a housing for enclosing dishes to be washed and fluid circulating means including fluid conduit portions extending within the housing. Particularly with such commercial dishwashers, sanitation requirements are best met by careful cleaning of the interior of the dishwasher housing. Such cleaning preferably involves removing at least portions of the fluid conduits mounted within the housing, in order that all surfaces of the housing may properly be cleaned. Heretofore, attempts to provide couplings which would permit separation of such conduit portions have introduced serious difficulty in that realignment of portions of the dishwasher was difficult to achieve and maintain. As will be appreciated, misaligned elements of a dishwasher may promptly lead to unsatisfactory cleaning of dishes, thereby compounding problems of sanitation.

While a commercial dishwasher has here been chosen as a specific example of such difficulties, persons familiar with the art of manually disengagable couplings generally will readily recognize instances where the same problems are encountered with other devices and arrangements.

With the aforementioned comments in mind, it is an object of the present invention to provide a coupling, for joining together fluid conduit portions for flow therethrough, which is readily manually disengagable while resisting rotational and angular displacement between the joined conduit portions. In realizing this object of the present invention, the coupling preferably comprises a pair of telescoping or matingly engaging tubular coupling members, each for connection with a corresponding conduit portion and having a radially directed abutment shoulder and axially directed rotation locking surfaces. The coupling members are locked together, when joining conduit portions, by an arrangement which urges the shoulders into abutment so as to resist angular displacement between the coupling members and which positions the rotational locking surfaces for engagement so as to resist rotational displacement between the coupling members.

Yet a further object of this invention is to facilitate maintenance of proper operating conditions within a dishwasher while accommodating ready cleaning of the interior thereof. In realizing this object of the present invention, a manually disengageable coupling in accordance with the present invention is inserted in a conduit portion extending within a dishwasher housing. By such use of the manually disengagable coupling of this invention, conduit portions extending within the housing may be readily removed in a one-handed operation, while being restored to necessary and desired alignment on reinstallation and maintained in such alignment during use.

Yet a further object of this invention is to maintain engagement of abutment shoulders and rotation locking surfaces of telescoping or matingly engaging tubular coupling members by the cooperation of locking members carried by one of the coupling members for radial movement and locking recesses for receiving the locking members and formed in the other of the coupling members. In accordance with particular features of this invention, the locking members and the locking recesses are spaced at differing distances from the abutment shoulders of the corresponding coupling members, thereby giving rise to forces urging the shoulders into abutment.

Some of the objects of the invention having been stated, other objects will appear as the description proceeds, when taken in connection with the accompanying drawings, in which FIG. 1 is a perspective view of a dishwasher incorporating the coupling of the present invention;

FIG. 2 is an enlarged elevation view, partially in section, showing a portion of the interior of the dishwasher of FIG. 1;

FIG. 3 is an enlarged elevation view, partly broken away, of the coupling of the present invention as installed in the dishwasher of FIGS. 1 and 2;

FIG. 4 is an exploded perspective view, partly broken away, of the coupling of the present invention;

FIG. 5 is an enlarged elevation view, in section, showing the coupling of the present invention as assembled; and FIG. 6 is a further enlarged view, similar to FIG. 5, showing certain spatial relationships among the elements of the coupling of this invention.

While this invention will be described hereinafter with particular reference to the accompanying drawings, which illustrate the coupling of this invention and one specific environment of use for that coupling, it is to be understood at the outset that it is contemplated that detailed changes may be made in the invention as hereinafter described. For that reason, the following description is to be taken as an enabling teaching for those skilled in the appropriate arts, and is accordingly to be read broadly and not as being restrictive upon the scope of this invention.

A particular environment for use of the present invention is that of a dishwasher such as the dishwasher generally indicated at 10 in FIG. 1. The dishwasher there shown is of a type used in the kitchens of restaurants and other establishments which feed large numbers of people, and includes a stainless steel or other metal housing means generally indicated at 11 for enclosing a space into which dishes and the like may be placed for washing. Typically, the housing 11 includes a bottom wall 12 and side walls 14 (FIG. 2).

As is generally known to persons familiar with the art of dishwashers, means are provided for circulating fluid within the housing means 11 for washing dishes. The fluid circulating means typically includes a fluid conduit 15 penetrating one wall 12 of the housing means and extending thereinto for delivering detergent, water and the like to an appropriate distributing means such as a spray arm 16. Sanitation requirements for the interior of the dishwasher 10 may require removal of the spray arm 16 and the conduit portions supplying the same, in order to assure cleaning of the entirety of the inside surface of the walls 12, 14. To that end, the dishwasher 10 incorporates a coupling means in accordance with the present invention which is generally indicated in FIG. 2 at 18. The coupling 18 is shown in greater detail in FIG. 3 through 6, as will now be described.

The coupling 18 comprises a pair of telescoping tubular coupling members generally indicated at 19 and 20. Preferably, the telescoping tubular coupling members 19, 20 are in the form of matingly engaging female and male coupling members. Each of the coupling members 19, 20 is constructed for connection with a corresponding conduit portion; in the form illustrated each is provided with a female type thread adjacent one terminal end portion thereof. Other forms of accomplishing such connection will be readily recognized by persons skilled in the appropriate arts. Each of the coupling members 19, 20 has a radially directed abutment shoulder and axially directed rotation locking surfaces. In the instance of one coupling member 19, configured as a female coupling member, the abutment shoulder 21 is positioned adjacent a terminal end of the one coupling member remote from the corresponding conduit portion. In the instance of the other coupling member 20, illustrated as a male coupling member, the abutment shoulder 22 is positioned intermediate the length of the coupling member.

In the form illustrated, the axially directed rotation locking surfaces have a configuration somewhat resembling a tongue and groove joint. Such an arrangement is accomplished by having the terminal end portion of the other coupling 20, remote from the corresponding conduit portion, cut back to leave a "tongue" portion with axially directed surfaces 24 which function as rotation locking surfaces. The one coupling member 19 has an interior portion thereof, intermediate the length of the one coupling member, notched to define a "groove" having axially directed locking surfaces 25.

The one coupling member 19 carries locking members for radial movement relative thereto at a predetermined distance from the shoulder 21 thereof. As illustrated, the locking members are a plurality of spherical members 26, each mounted within a radially bored opening through a portion of the one coupling member 19. As best illustrated in FIG. 6, the spherical locking members 26 are spaced from the abutment shoulder 21 at a predetermined distance A.

In order to receive the locking members 26 as described more fully hereinafter, locking recess means are formed in the other coupling member 20, at a distance B from the shoulder 22 thereof less than the predetermined distance A described hereinabove. The purpose of the differential spacing will become more clear from the description which follows. In the form illustrated, the locking recess means comprises a plurality of part spherical indentations or dimples 28 spaced circumferentially about the other coupling member 20 with a spacing appropriate for cooperating with locking members 26.

In order to control the operative cooperation of the locking members 26 and locking recess means 28, the coupling of the present invention includes manually operable means for selectively releasing the locking members to freely move radially in accommodation of telescopic relative movement between the coupling members and, alternatively, urging the locking members radially toward the other coupling member 20 and into engagement with the locking recess means 28. In the form illustrated, the manually operable means takes the form of a sleeve 29 encircling the locking members 26 and a portion of the one member 19. The sleeve 29 is movable axially relative to the one coupling member 19 to and from a first position (FIGS. 5 and 6), in which the sleeve member engages the locking members 26 for urging the same radially, and a second position (FIG. 3), in which the sleeve member is disengaged from the locking members 26 so as to permit the locking members 26 to withdraw from the locking recess means 28 and free the coupling members 19, 20 for relative telescopic movement.

It will be noted that the sleeve 29 includes an interior camming surface 30 (FIG. 6) which has a generally conical configuration converging toward the corresponding conduit portion (upwardly at FIG. 6). Such camming surface 30 acts, in accordance with the present invention, to urge the locking members 26 inwardly towards the locking recess means 28. More particularly, a spring member in the form of a helically wound compression spring 31 acts between the one coupling member 19 and the sleeve 29 to urge the sleeve toward the first position (FIG. 6), in which the camming surface 30 biases the locking members 26 inwardly.

Due to the configuration of the locking members and the locking recesses and to the difference between the predetermined distances A and B as described hereinabove, such radially inward urging of the locking members 26 into the slightly misaligned locking recess means 28 (FIG. 6) causes the locking members to extend into the locking recess means for less than the full radial depth thereof and wedge thereagainst so as to imposes on the coupling members 19, 20 an axially directed force urging the shoulders 21, 22 into abutment and thereby restricting angular misalignment between the coupled conduit portions.

As will be further understood, full mating engagement of the coupling members 19, 20 is only possible where tongue and groove joining of the axially directed rotational locking surfaces has occurred (FIG. 5). When in such a relation, a fluid tight seal is assured for the coupling by an O-ring 32 positioned within the one coupling member 19.

In the drawings and specification, there has been set forth a preferred embodiment of the invention, and although specific terms are employed, they are used in a generic and descriptive sense only and not for purposes of limitation.

That which is claimed is:

1. A manually disengagable coupling for joining together fluid conduit portions for flow therethrough while resisting rotational and angular displacement between the joined conduit portions, the coupling comprising a pair of telescoping tubular coupling members each for connection with a corresponding conduit portion and having a radially directed abutment shoulder and axially directed rotation locking surfaces; locking members carried by one of said coupling members for radial movement relative thereto at a predetermined distance from said shoulder thereof; locking recess means for receiving said locking members and formed in the other of said coupling members at a distance from said shoulder thereof less than said predetermined distance; and manually operable means for selectively (a) releasing said locking members to freely move radially in accommodation of telescopic relative movement between said coupling members and (b) urging said locking members radially toward said other coupling member and into engagement with said locking recess means; the configuration of said locking members and said locking recess means and the spacing thereof one relative to the other being such that said locking members extend into said locking recess means for less than the full radial depth thereof and wedge thereagainst for exerting therebetween a force directed axially of said coupling members, said locking members and said locking recess means functioning when in engagement for exerting a loading force urging said shoulders into abutment so as to prevent angular displacement between said coupling members and for positioning said rotational locking surfaces for engagement so as to prevent rotational displacement between said coupling members.

2. A coupling according to claim 1 wherein said shoulder of said one coupling member is positioned adjacent a terminal end of said one coupling member remote from said corresponding conduit portion and further wherein said shoulder of said other coupling member is positioned intermediate the length of said other coupling member.

3. A coupling according to claim 1 wherein said rotation locking surfaces of said other coupling member are positioned adjacent a terminal end of said other coupling member remote from said corresponding conduit portion and further wherein said rotation locking surfaces of said one coupling member are positioned intermediate the length of said one coupling member.

4. A coupling according to claim 1 wherein said locking members comprise a plurality of ball members spaced circumferentially about said one coupling member.

5. A coupling according to claim 1 wherein said locking recess means comprises a plurality of part spherical indentations spaced circumferentially about said other coupling member.

6. A coupling according to claim 1 wherein said manually operable means comprises a sleeve member encircling said locking members and a portion of said one coupling member and movable axially relative thereto to and from a first position in which said sleeve member engages said locking members for urging the same radially and a second position in which said sleeve member is disengaged from said locking members, and spring means for biasing said sleeve member toward said first position.

7. A coupling according to claim 1 wherein said one coupling member matingly receives a portion of said other coupling member and further wherein said manually operable means selectively urges said locking members radially inwardly.

8. A manually disengagable coupling for joining together fluid conduit portions for flow therethrough while resisting rotational and angular displacement between the joined conduit portions, the coupling comprising a pair of matingly engaging tubular coupling members each for affixing to a corresponding conduit portion and having a radially directed abutment shoulder and axially directed rotation locking surfaces; a plurality of spherical locking members distributed circumferentially about a female one of said coupling members for radial movement relative thereto at a predetermined distance from said shoulder thereof; a plurality of part spherical locking recesses distributed circumferentially about a male one of said coupling members at a distance from said shoulder thereof less than said predetermined distance for receiving said locking members; and manually operable sleeve means encircling said locking members and a portion of said female coupling member for axial movement relative thereto, said sleeve means having an inwardly facing cam surface for engaging said locking members and cooperating therewith for selectively (a) releasing said locking members to freely move radially in accommodation of telescopic relative movement between said coupling members and (b) urging said locking members radially toward said male coupling member and into engagement with said locking recesses; the configuration of said locking members and locking recesses and the spacing thereof one relative to the other being such that said locking members extend into said locking recesses for less than the full radial depth thereof and wedge thereagainst for exerting therebetween a force directed axially of said coupling members, said locking members and said locking recesses functioning when in engagement for exerting a loading force urging said shoulders into abutment so as to prevent angular displacement between said coupling members and for positioning said rotational locking surfaces for engagement so as to prevent rotational displacement between said coupling members.

9. In a dishwasher having housing means for enclosing dishes to be washed and means for circulating fluid within said housing means for washing dishes and including fluid conduit means having portions extending within said housing means, an improvement which comprises manually disengagable coupling means interposed between two of said conduit means portions for joining the same together while resisting rotational and angular displacement therebetween, and wherein said coupling means comprises first and second telescoping tubular coupling members each having a radially directed abutment shoulder and axially directed rotation locking surfaces; locking members carried by one of said coupling members for radial movement relative thereto at a predetermined distance from said shoulder thereof; locking recess means for receiving said locking members and formed in the other of said coupling members at a distance from said shoulder thereof less than said predetermined distance; and manually operable means for selectively (a) releasing said locking members to freely move radially in accommodation of telescopic relative movement between said coupling members and (b) urging said locking members radially toward said other coupling member and into engagement with said locking recess means; the configuration of said locking members and said locking recess means and the spacing thereof one relative to the other being such that said locking members extend into said locking recess means for less than the full radial depth thereof and wedge thereagainst for exerting therebetween a force directed axially of said coupling members, said locking members and said locking recess means functioning when in engagement for urging said shoulders into abutment so as to prevent angular displacement between said coupling members and for positioning said rotational locking surfaces for engagement so as to prevent rotational displacement between said coupling members.

* * * * *